United States Patent
Sohn

(10) Patent No.: US 6,333,912 B1
(45) Date of Patent: Dec. 25, 2001

(54) SELF-COMPENSATING DYNAMIC BALL BALANCER FOR DISK PLAYER

(75) Inventor: Jin-seung Sohn, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/240,878

(22) Filed: Feb. 1, 1999

(51) Int. Cl.⁷ .................................................. G11B 19/20

(52) U.S. Cl. ........................................... 369/263; 369/266

(58) Field of Search ..................................... 369/263, 264, 369/258, 266, 270, 282; 360/99.04, 99.08, 99.12; 74/572, 573 R, 573 F, 574

(56) References Cited

U.S. PATENT DOCUMENTS

| | | | |
|---|---|---|---|
| 3,109,321 | * 11/1963 | Rogers | 74/573 R |
| 3,282,127 | * 11/1966 | Deakin | 74/573 R |
| 3,696,688 | 10/1972 | Goodrich et al. | |
| 3,799,619 | * 3/1974 | LaBarber | 74/573 R |
| 3,854,347 | * 12/1974 | Hellerich | 74/573 R |
| 4,060,009 | * 11/1977 | Wyman | 74/573 R |
| 4,075,909 | * 2/1978 | Deakin | 74/573 R |
| 4,674,356 | * 6/1987 | Kilgore | 74/573 R |
| 5,111,713 | * 5/1992 | Cameron et al. | 74/573 R |
| 5,845,542 | * 12/1998 | Hannah et al. | 74/573 R |
| 5,857,360 | * 1/1999 | Kim et al. | 74/573 R |
| 5,903,540 | * 5/1999 | Ro et al. | 369/263 |
| 5,941,133 | * 8/1999 | Wierba et al. | 74/573 R |
| 6,005,311 | * 12/1999 | Matsushima | 360/99.08 |
| 6,005,749 | * 12/1999 | Ikuta et al. | 360/99.12 |
| 6,061,325 | * 5/2000 | Zaun | 369/264 |
| 6,125,098 | * 9/2000 | Osawa | 369/263 |
| 6,132,354 | * 10/2000 | Ohtsu et al. | 74/573 R |
| 6,155,134 | * 12/2000 | Ikuta et al. | 369/263 |
| 6,205,110 | * 3/2001 | Miyamoto et al. | 369/266 |

FOREIGN PATENT DOCUMENTS

| | | |
|---|---|---|
| 52-11147 | 3/1977 | (JP) . |
| 58-133673 | 8/1983 | (JP) . |
| 3045377 | 11/1997 | (JP) . |
| 10-83622 | * 3/1998 | (JP) . |

(List continued on next page.)

OTHER PUBLICATIONS

Japanese Patent Office Action, dated Feb. 27, 2001.

Primary Examiner—David L. Ometz
(74) Attorney, Agent, or Firm—Robert E. Bushnell, Esq.

(57) ABSTRACT

In a self-compensating dynamic ball balancer for a disk player including a deck plate, a spindle motor is installed at the deck plate for providing a rotational force to a disk. A turntable is installed at a rotation shaft of the spindle motor for accommodating the disk. A clamper holds the disk in place on the turntable and an optical pickup is installed at the deck plate to be capable of moving across the disk for recording and/or reproducing information on/from the disk. The self-compensating dynamic ball balancer also includes a main body, having a circular race, installed at at least one among a rotor of the spindle motor, a rotation shaft of the spindle motor, the turntable, and the clamper. A plurality of balls are placed inside the race such that the center of gravity thereof is located opposite to that of the disk with respect to the rotation shaft of the spindle motor by the centrifugal force generated during rotation of the disk. A cover member is installed to cover an opening of the race. The race of the main body has a bottom surface, an inner circumferential wall, and an outer circumferential wall. The outer circumferential wall and/or the bottom surface are shaped to be able to guide the movement of the balls which contact the outer circumferential wall of the race by the centrifugal force generated when the disk is rotated at the recording and/or reproducing speed.

20 Claims, 11 Drawing Sheets

FOREIGN PATENT DOCUMENTS

| | | |
|---|---|---|
| 10-124990 | 5/1998 | (JP) . |
| 10-188465 * | 7/1998 | (JP) . |
| 10-208374 * | 8/1998 | (JP) . |
| 10-243604 * | 9/1998 | (JP) . |
| 11-096661 | 4/1999 | (JP) . |
| 11-154371 | 6/1999 | (JP) . |
| 12-082254 | 3/2000 | (JP) . |
| 12-090557 | 3/2000 | (JP) . |
| 3051386 | 3/2000 | (JP) . |
| 98-032661 | 7/1998 | (KR) . |

* cited by examiner

SELF-COMPENSATING DYNAMIC BALL BALANCER FOR DISK PLAYER

BACKGROUND OF THE INVENTION

1. Field of the Invention

The present invention relates to dynamic information storage and retrieval, particularly to disk players, and more particularly to suppression of resonance, or wobbling, due to the rotation of the disk.

2. Description of the Related Art

In general, a disk player records and/or reads information onto and/or from a recording medium such as a compact disk (CD), a CD-ROM, a digital versatile disk (DVD), and a DVD-ROM. Due to the sensitivity of the reading/recording process to vibration, the disk player must protect the disk and optical pickup from external impacts and internal vibrations.

A typical disk player includes a deck base hinge-coupled to a housing to be capable of rotating vertically, a deck plate coupled to the deck base, a spindle motor installed at the deck plate for providing a rotational force to a disk, a turntable coupled to a rotational shaft of the spindle motor for accommodating the disk, a damper installed on the inner surface of the upper portion of the housing to face the turntable for securing the disk placed on the turntable, and an optical pickup coupled to the deck plate to be capable of moving across the disk for performing recording and reproduction operations. The disk player includes dampening members disposed between the deck base and the deck plate to prevent external vibrations transferred through the deck base from being transferred directly to the deck plate, the spindle motor and the optical pickup. The dampening member is formed of a material such as soft rubber or polyurethane which can absorb external impacts.

The disk player adopting the dampening member as above can effectively protect the driving of the disk and the optical pickup from external impacts. However, a method of dampening internal vibrations generated by the rotation of the spindle motor due to an eccentric center of gravity of the disk is not provided for. Here, the eccentric center of gravity of the disk is caused by a discrepancy between the rotational center of the disk and the center of gravity of the disk due to errors in the manufacturing process of the disk. Thus, the rotational shaft of the spindle motor wobbles, or revolves, as it rotates.

Such wobbling of the rotational shaft of the spindle motor does not affect low-speed disk players such as a 1× or 2× disk players. However, in the case of high-speed disk players such as a 6×–40× disk players, the effects of wobbling of the spindle motor become serious, making recording/reproducing of information difficult. To overcome the above problems, in a conventional high-speed disk player, the mass of the deck plate where the spindle motor is installed is increased or the rigidity of the dampening member is increased to reduce movements of the deck plate due to the eccentric center of gravity of the disk.

However, not only is an inappropriately increased mass of the deck plate required for high speed rotation, but also the cost of the product increases and miniaturization of the product is hindered. Also, when the rigidity of the dampening member is increased, it is not possible to effectively dampen external impacts or vibrations.

Taking the above problems into consideration, U.S. patent application Ser. No. 08/947,895 filed on Oct. 9, 1997 by the present applicant discloses a disk player adopting a self-compensating dynamic balancer. The disclosed apparatuses use the relationship between an eccentric center of gravity position of a disk, the position of a rotation shaft and the center of rotation respectively according to different rotation speeds of the disk.

When the rate of orbital rotation of the spindle motor is less than or equal to the natural frequency of the deck plate, the natural frequency is determined by the elastic modulus of the dampening member and the mass of the deck plate and other elements to be installed on the deck plate, and represents the rate of vibration in a horizontal direction, i.e., in a direction parallel to the plane of the disk. When an eccentric center of gravity exists at a position spaced apart by a predetermined distance from the ideal rotation center of the disk, the ideal rotation center of the disk rotates around a center. In this case, the respective positions of the eccentric center of gravity and the revolution center of the disk are located opposite each other with respect to each of the ideal rotation center positions of the disk.

When the rate of revolution of the spindle motor is near the natural frequency of the deck plate, the revolution center is located in a direction perpendicular to that of the respective eccentric center of gravity positions with respect to the ideal rotation center positions. When the rate of revolution of the spindle motor is greater than the natural frequency of the deck plate, which corresponds to the normal rotation speed of a disk allowing information to be recorded onto or read from the disk, the revolution center is located in the same direction as the respective eccentric center of gravity positions with respect to the ideal rotation center positions.

As described above, in order to use the relationship between the center of revolution and the eccentric center of gravity of the disk, the self-compensating dynamic balancer is adopted to a rotating body such as the turntable, a rotor of the spindle motor, a rotation shaft of the spindle motor, and the clamper. Thus, the compensated mass of the self-compensating dynamic balancer and the eccentric mass are located in opposite directions with respect to the rotation shaft of the rotating body so that the internal vibrations of a disk player are effectively reduced. As shown in the above, when the self-compensating dynamic balancer is adopted, external impacts can be dampened by adopting dampening members exhibiting a relatively weak rigidity. However, the above balancer may lose balancing capability since a contact area with the balls forming the compensated mass is large.

SUMMARY OF THE INVENTION

It is therefore an object of the present invention to provide an improved disk player apparatus.

It is a further object of the present invention to provide a dynamic balancer which prevents wobbling of the disk due to an eccentric center of gravity.

It is a yet further object of the present invention to provide a dynamic balancer without increasing the mass of the deck plate.

It is a still further object of the present invention to provide a dynamic balancer of low cost.

It is another object of the present invention to provide a dynamic balancer which allows for miniaturization of the disk player.

It is yet another object of the present invention to provide a dynamic balancer which does not compromise dampening of external vibrations.

The present invention is provided to improve upon the invention of the above referenced application filed by the present applicant. The present invention provides a self-compensating dynamic ball balancer for a disk player in which the shape of a race where a plurality of balls are placed to be capable of freely moving is modified to reduce the contact area between the balls and race during rotation at the natural frequency of a deck plate, thus improving the balancing capability.

Accordingly, to achieve the above objectives, there is provided a self-compensating dynamic ball balancer for a disk player including a deck plate; a spindle motor installed at the deck plate for providing a rotational force to a disk; a turntable installed at a rotation shaft of the spindle motor for accommodating the disk; a damper for holding the disk in place on the turntable; and an optical pickup installed at the deck plate to be capable of moving across the disk for recording and/or reproducing information on/from the disk, the self-compensating dynamic ball balancer comprising: a main body, having a circular race, installed at at least one among a rotor of the spindle motor, a rotation shaft of the spindle motor, the turntable, and the clamper; a plurality of balls placed inside the race such that the center of gravity thereof is located opposite to that of the disk with respect to the rotation shaft of the spindle motor by the centrifugal force generated during rotation of the disk; and a cover member for covering an opening of the race, in which the race of the main body has a bottom surface, an inner circumferential wall, and an outer circumferential wall, and the outer circumferential wall and/or the bottom surface are shaped to be able to guide the movement of the balls which contact the outer circumferential wall of the race by the centrifugal force generated when the disk is rotated at the recording and/or reproducing speed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
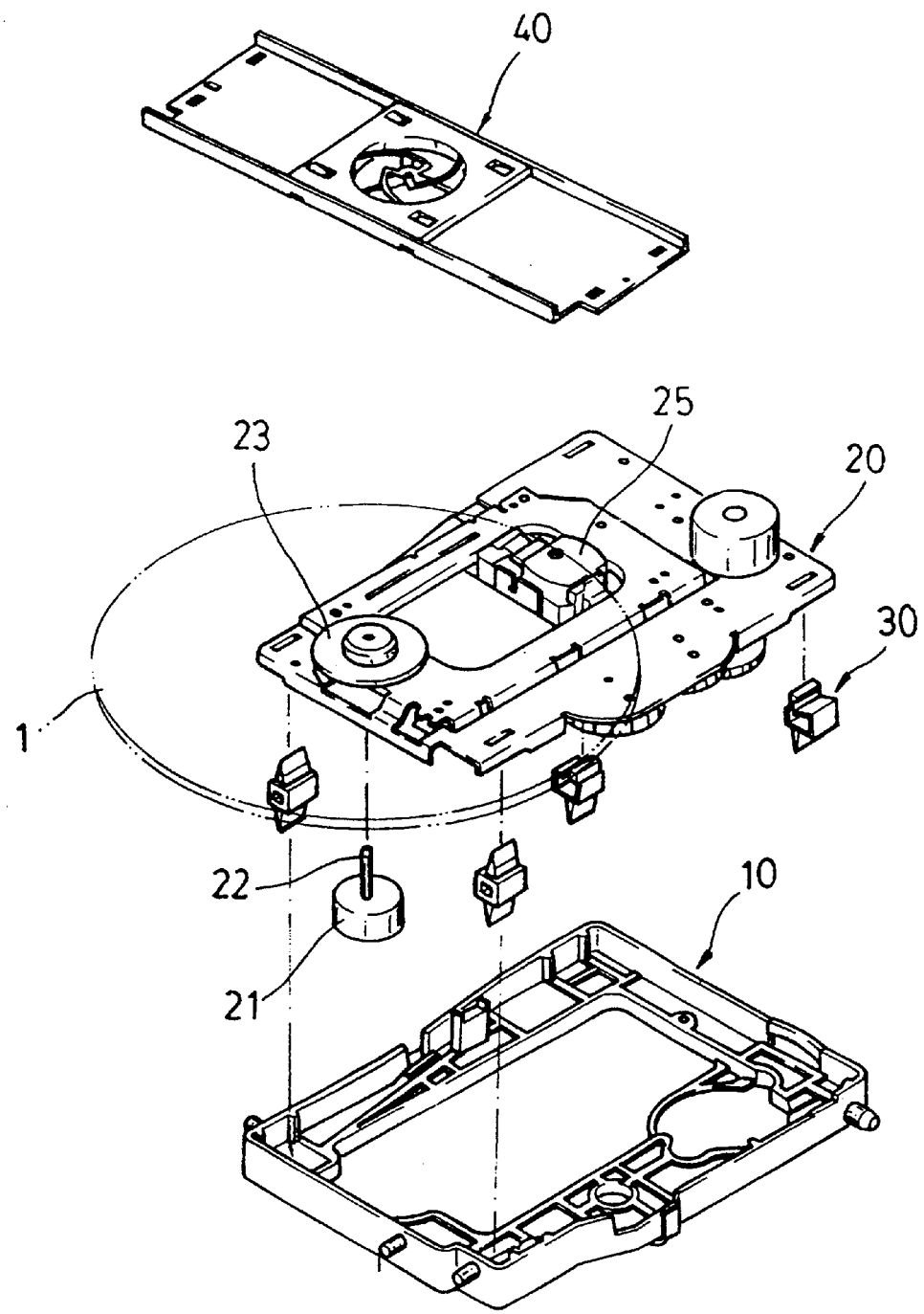
FIG. 1 is an exploded perspective view schematically illustrating a conventional disk player.

Turning now to the drawings, the typical disk player described above, as shown in FIG. 1, includes a deck base 10 hinge-coupled to a housing (not shown) to be capable of rotating vertically, a deck plate 20 coupled to the deck base 10, a spindle motor 21 installed at the deck plate 20 for providing a rotational force to a disk 1, a turntable 23 coupled to a rotational shaft 22 of the spindle motor 21 for accommodating the disk 1, a damper 40 installed on the inner surface of the upper portion of the housing to face the turntable 23 for securing the disk 1 placed on the turntable 23, and an optical pickup 25 coupled to the deck plate 20 to be capable of moving across the disk 1 for performing recording and reproduction operations. The disk player includes dampening members 30 disposed between the deck base 10 and the deck plate 20 to prevent external vibrations transferred through the deck base 10 from being transferred directly to the deck plate 20, the spindle motor 21 and the optical pickup 25. The dampening member 30 is formed of a material such as soft rubber or polyurethane which can absorb external impacts.

The disk player adopting the dampening member 30 as above can effectively protect the driving of the disk 1 and the optical pickup 25 from external impacts. However, a method of dampening internal vibrations generated by the rotation of the spindle motor 21 due to an eccentric center of gravity of the disk is not provided for. Here, the eccentric center of gravity of the disk is caused by a discrepancy between the rotational center of the disk and the center of gravity of the disk due to errors in the manufacturing process of the disk. Thus, the rotational shaft of the spindle motor 21 wobbles, or revolves, as it rotates.

With regards to the disclosure of U.S. patent application Ser. No. 08/947,895, discussed above, the disclosed apparatuses use the relationship between an eccentric center of gravity position of a disk, the position of a rotation shaft and the center of rotation respectively according to different rotation speeds of the disk, which will be described with reference to FIGS. 2A through 2C.

Figure 2A:
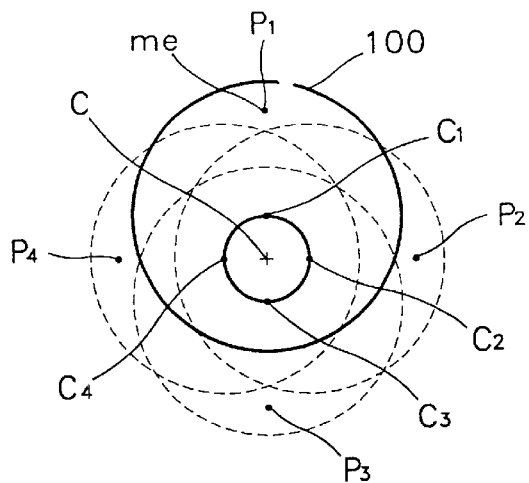
FIGS. 2A through 2C are diagrams showing the relationship between an eccentric center of gravity position of a disk, the position of a rotation shaft and the center of rotation respectively according to different rotation speeds of the disk.

FIG. 2A is a diagram schematically showing the orbital and rotational movements of the disk when the rate of orbital rotation of the spindle motor is equal to or less than the natural frequency of the deck plate. Here, the natural frequency is determined by the elastic modulus of the dampening member and the mass of the deck plate and other elements to be installed on the deck plate, and represents the rate of vibration in a horizontal direction, i.e., in a direction parallel to the plane of the disk. As shown in the drawing, when an eccentric center of gravity $m_e$, exists at a position $p_1$ spaced apart by a predetermined distance from the ideal rotation center $c_1$ of the disk 1, the ideal rotation center $c_1$ of the disk rotates around a center c, moving to positions $c_2$, $c_3$ and $c_4$. The positions of the eccentric center of gravity $m_e$ of the disk corresponding to each of the ideal rotation center positions $c_2$, $c_3$ and $c_4$ respectively are $p_2$, $p_3$ and $p_4$. In this case, the respective positions $p_1$, $p_2$, $p_3$ and $p_4$ of the eccentric center of gravity $m_e$ and the revolution center c of the disk 100 are located opposite each other with respect to each of the ideal rotation center positions $c_1$, $c_2$, $c_3$ and $c_4$ of the disk 100.

Figure 2B:
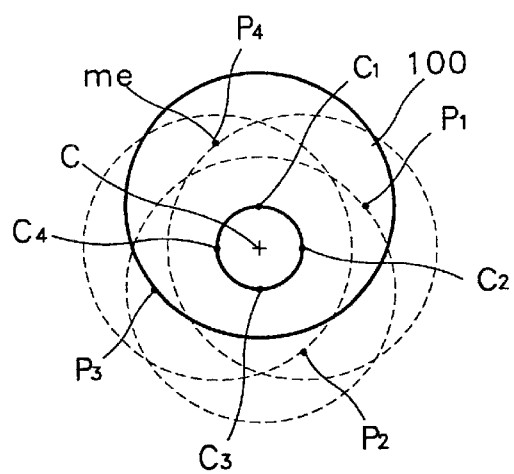

FIG. 2B is a diagram schematically showing the orbital and rotational movements of the disk when the rate of revolution of the spindle motor is near the natural frequency of the deck plate. As shown in the drawing, the revolution center c is located in a direction perpendicular to that of the respective eccentric center of gravity positions $p_1$, $p_2$, $p_3$ and $p_4$ with respect to positions $c_1$, $c_2$, $c_3$ and $c_4$.

Figure 2C:
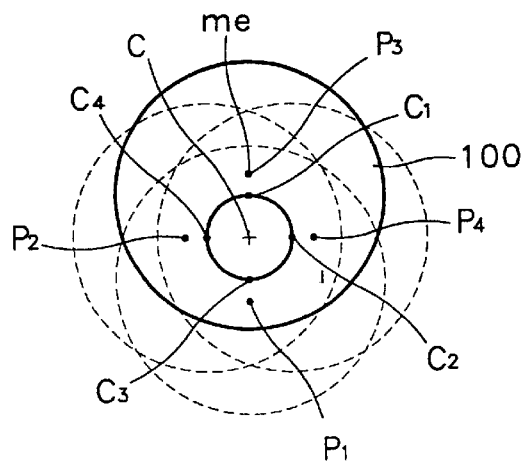

FIG. 2C is a diagram schematically showing the orbital and rotational movements of the disk when the rate of revolution of the spindle motor is greater than the natural frequency of the deck plate, which corresponds to the normal rotation speed of a disk allowing information to be recorded onto or read from the disk. As shown in the drawing, the revolution center c is located in the same direction as the respective eccentric center of gravity positions $p_1$, $p_2$, $p_3$ and $p_4$ with respect to positions $c_1$, $c_2$, $c_3$ and $c_4$.

Figure 3:
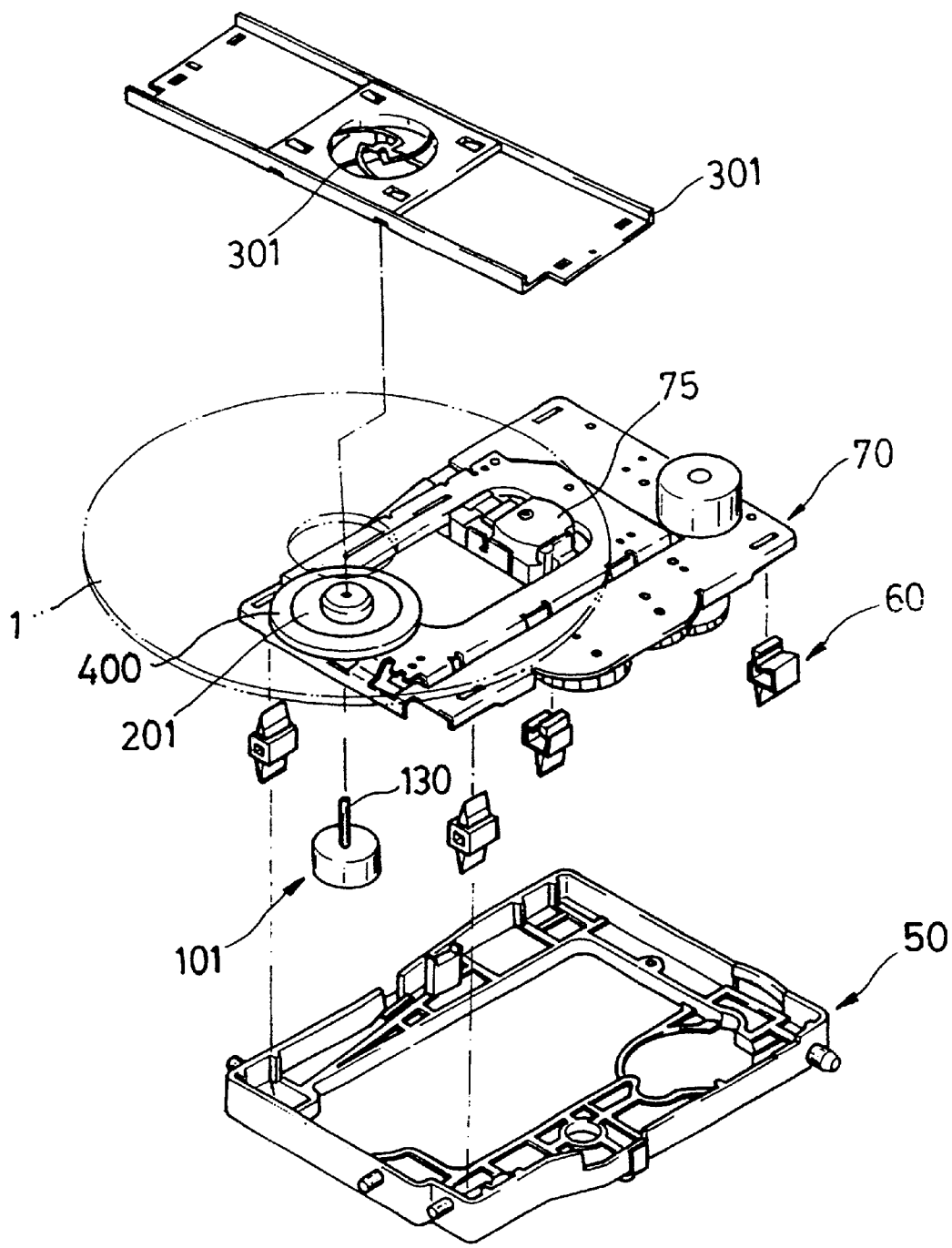
FIG. 3 is an exploded perspective view illustrating a disk player adopting a self-compensating dynamic ball balancer according to a preferred embodiment of the present invention.

The present invention will now be described with reference to the accompanying drawings. As shown in FIG. 3, a disk player includes a deck base 50, a deck plate 70 elastically coupled to the deck base 50, a dampening member 60 interposed between the deck base 50 and the deck plate 70, a spindle motor 101 installed at the deck plate 70, a turntable 201 and an optical pickup 75, and a clamper 301 installed to face the turntable 201 for holding a disk 1 placed on the turntable 201. A self-compensating dynamic ball balancer 400 according to a preferred embodiment of the present invention is installed at at least one rotating body of the disk player, i.e., the spindle motor 101, the turntable 201, or the damper 301.

Figure 4:
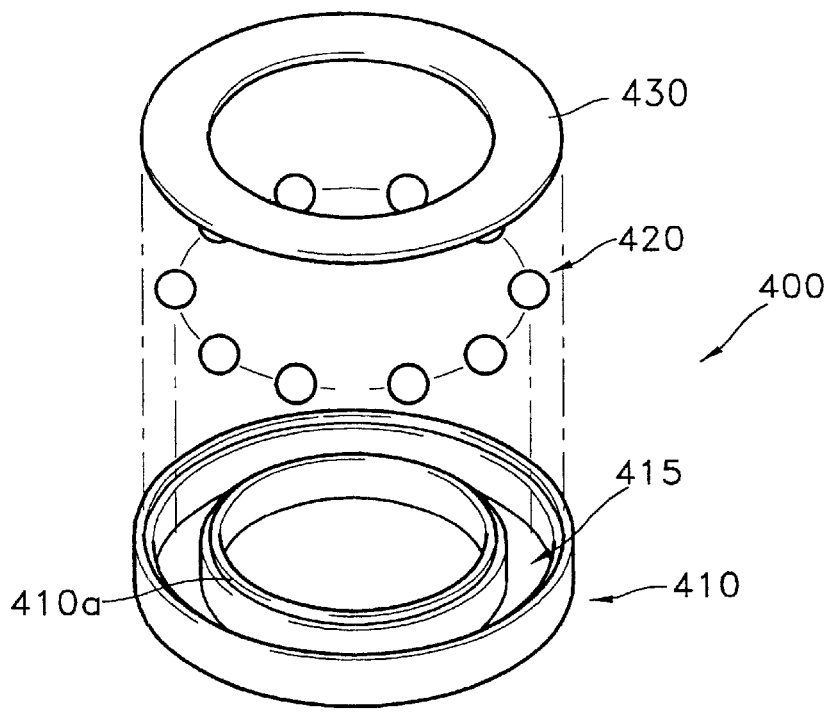
FIG. 4 is an exploded perspective view illustrating the self-compensating dynamic ball balancer according to the preferred embodiment of the present invention.
Figure 5:
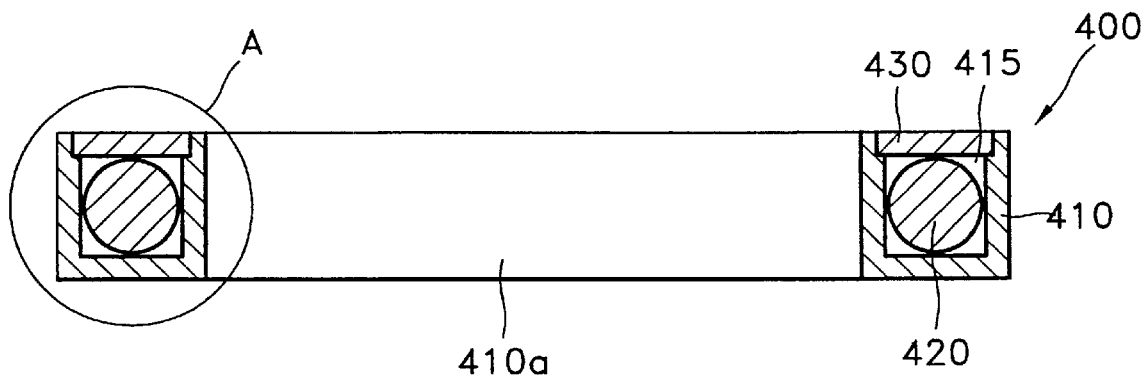
FIG. 5 is a cross sectional unexploded view of the self-compensating dynamic ball balancer shown in FIG. 4.

The self-compensating dynamic ball balancer 400, as shown in FIGS. 4 and 5, comprises a circular main body 410 having a race 415 formed therein, a plurality of balls 420 inside in the race 415, and a cover member 430 covering the race 415 by being coupled to the main body 410. The cover member 430 can be coupled to the main body 410 using an adhesive, grooves and protrusions formed at corresponding positions, or screws.

The race 415 can be open at the entire upper portion thereof, or a portion thereof, for insertion of the balls 420. The balls 420 move in a radial direction away from the center of the main body 410 due to centrifugal force during rotation of the rotating body.

The self-compensating dynamic ball balancer 400 can be independently configured to be adopted to a typical disk player. Also, the main body 410 can be coupled to at least one of the spindle motor 101 the turntable 201, and the damper 301. In this case, preferably, a coupling hole 410a is formed at the center of the main body 410. Also, the main body 410 of the self-compensating dynamic ball balancer 400 can be formed integrally with the rotational shaft 22 of the spindle motor 101, the turntable 201, or the damper 301.

Figure 6A:
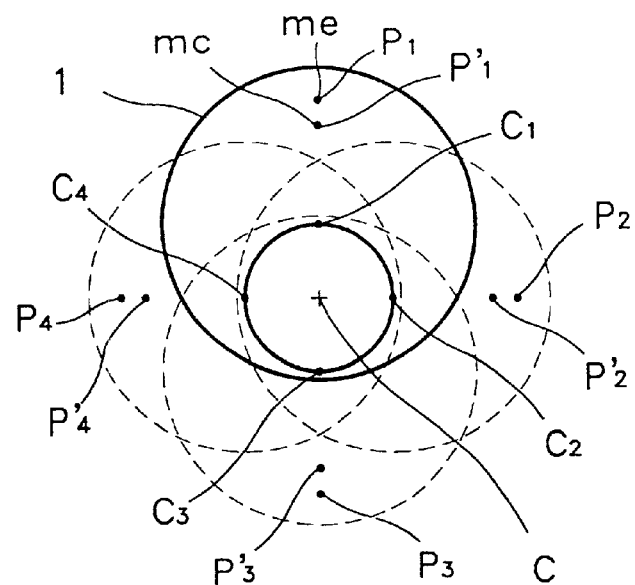
FIGS. 6A and 6B are diagrams showing the relationship between the eccentric center of gravity position of a disk, the position of the rotation shaft, and the ideal center of rotation respectively according to different rotation speeds of the disk of the disk player having the self-compensating dynamic ball balancer according to the present invention.

Hereinafter, the effects of vibration reduction in the self-compensating dynamic ball balancer for a disk player according to the present invention will be described with reference to FIGS. 6A and 6B. When the rate of orbital rotation of the disk 1 is equal to or less than the natural frequency, as shown FIG. 6A, the position ($p_i$, i=1, 2, 3 and 4) of the eccentric center of gravity $m_e$ of the disk 1 and the position ($p'_i$, i=1, 2, 3 and 4) of a compensated mass $m_e$, i.e., the center of gravity of the self-compensating dynamic balancer including the race, the balls and the cover member, are located opposite the revolution center c, with respect to the corresponding positions ($c_i$, i=1, 2, 3 and 4) of the rotation shaft. Thus, the degree of eccentricity of the rotation becomes large.

Figure 6B:
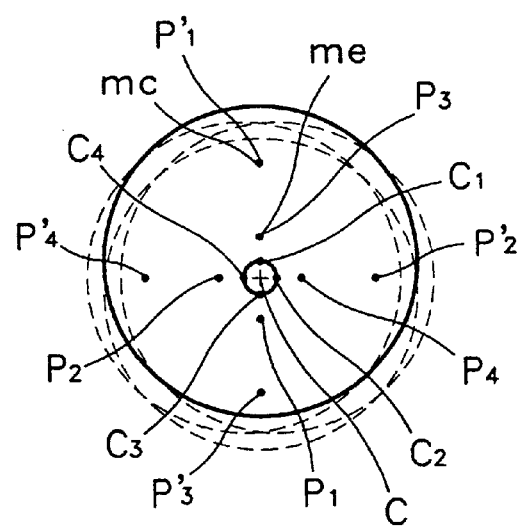

However, when the angular frequency of the disk 1 is much greater than the natural frequency as when the disk rotates at a normal speed, as shown in FIG. 6B, the revolution center c and the position ($p_i$, i=1, 2, 3 and 4) of the eccentric center of gravity $m_e$ of the disk 1 are located in the same direction with respect to the rotation shaft, and the position ($p'_i$, i=1, 2, 3 and 4) of the compensated mass $m_c$ is located in the opposite direction due to the centrifugal force. Thus, an unbalanced state generated due to the eccentric center of gravity $m_e$ of the disk 1 is compensated for and the eccentricity of rotation of the rotation shaft is drastically reduced. Consequently, the internal vibratory force of the deck plate due to the eccentric center of gravity $m_e$ of the disk 1 is alleviated.

The present invention, as shown in FIGS. 7A through 7K, is characterized in that the shape of the race 415 is modified to minimize sliding frictional force since the sliding frictional force occurring between the ball and the race is greater than the rolling frictional force when a disk player is rotated, so that the self-compensating dynamic ball balancer operates normally. Here, the race 415 has an inner wall 415a, a bottom surface 415b, and an outer circumferential wall 415c. The bottom surface 415b and/or the outer circumferential wall 415c of the race 415 are modified in their shapes.

When the race 415 rotates at a high speed, the balls 420 move inside the race 415 to find a compensated position, and the balls 420 contact the race 415 in an axial direction and in a direction perpendicular to the axial direction. Here, since the balls 415 receive a centrifugal force due to the rotation of the race 415, the balls 415 slide in the axial direction and roll in the direction perpendicular to the axial direction while being in contact with the race 415. Thus, if the balls 410 can be prevented from contacting the bottom surface 415b of the race 415 or the contact area can be reduced by using the above physical principle, the overall frictional force decreases and the balancing capability improves.

For such purpose, in the cross-sectional shape of the race 415 taken perpendicular to the direction of rotation, the shapes of the inner circumferential wall 415a and the outer circumferential wall 415c of the race 415 are asymmetrical to each other. That is, the inner circumferential wall 415a is formed to be perpendicular to the bottom surface 415b, while the outer circumferential wall 415c is formed in diverse shapes such that movements of the balls 420 can be guided when they contact the outer circumferential wall 415c by a centrifugal force.

Figure 7A:
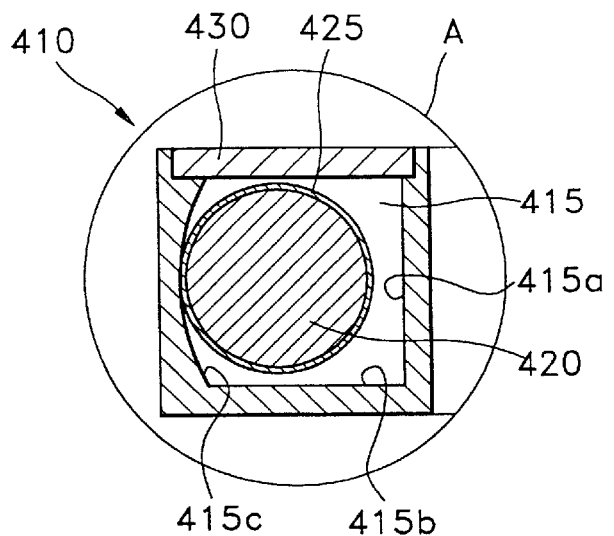
FIGS. 7A through 7K are cross sectional views of races of self-compensating dynamic ball balancers according to preferred embodiments of the present invention.

The following descriptions are for explaining various embodiments of the race 410. FIGS. 7A through 7K each are magnified views of portion "A" of FIG. 5. Referring to FIG. 7A, the inner circumferential wall 415a of the race 415 is formed to be perpendicular to the bottom surface 415b thereof. The whole surface of the outer circumferential wall 415c is arc-shaped to secure a large contact area with the ball 420. Preferably, the diameter of an arc of the outer circumferential wall 415c is greater than that of the ball 420 thus, when the main body 410 is rotated, the ball 420 is separated from the bottom surface 415b by a centrifugal force and contacts the outer circumferential wall 415c only. Thus, fine processing of the bottom surface 415b is not needed and a frictional force occurring due to contact between the ball 420 and the race 415 can be reduced.

Figure 7B:
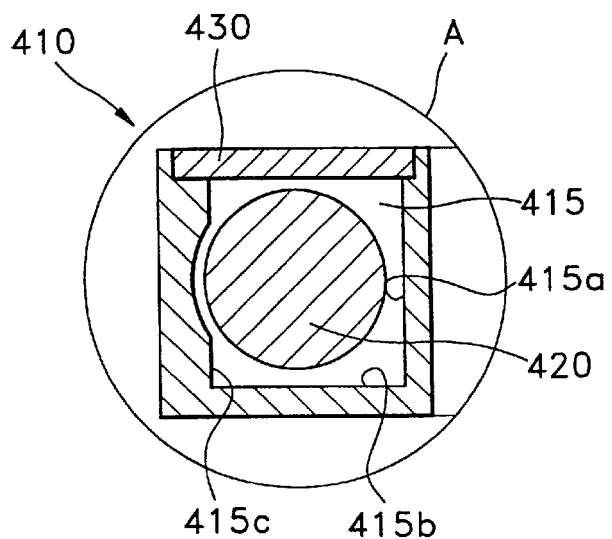

Referring to FIG. 7B, the outer circumferential wall 415c of the race 415 is formed to be parallel to the inner circumferential wall 415a and perpendicular to the bottom surface 415b. The outer circumferential wall 415c is formed to be a concave, relative to the interior of the race, at the middle portion thereof. Thus, fine processing of the bottom surface 415b is not needed and a frictional force occurring due to contact between the ball 420 and the race 415 can be reduced.

Figure 7C:
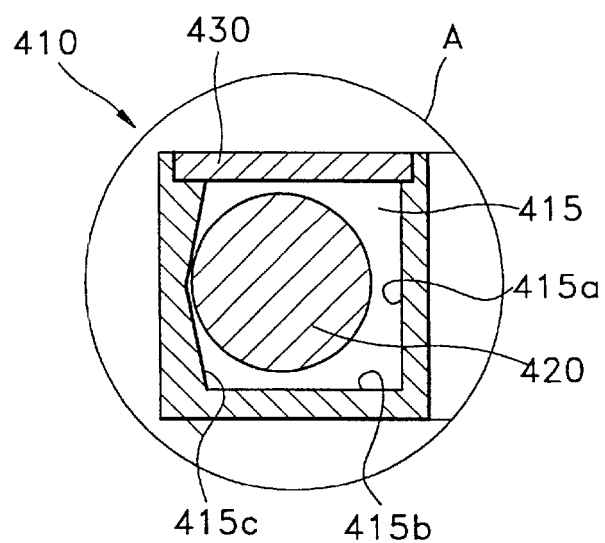

Referring to FIG. 7C, the outer circumferential wall 415c of the race 415 is shaped as a notch. The notch points outward from the interior of the race. When the main body 410 is rotated, the ball 420 contacts only the outer circumferential wall 415c. Thus, fine processing of the bottom surface 415b is not needed and a frictional force between the ball 420 and the race 415 can be reduced.

Figure 7D:
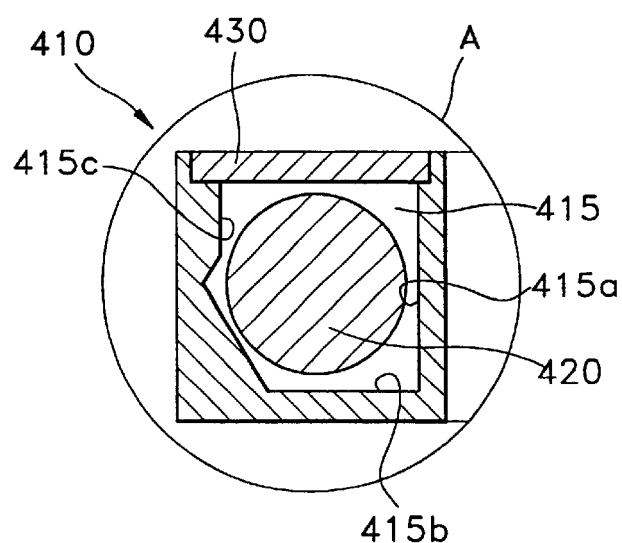

Referring to FIG. 7D, the outer circumferential wall 415c of the race 415 is shaped as a notch which is asymmetrical between upper and lower portions thereof. That is, the upper portion of the outer circumferential wall 415c is formed to be perpendicular to the bottom surface 415b while an angled surface is formed throughout the lower portion of the outer circumferential wall 415c and a part of the bottom surface 415b to contact the ball 420. The notch is formed at the middle portion of the outer circumferential wall 415c. Thus, fine processing of the bottom surface 415b is not needed and a frictional force between the ball 420 and the race 415 can be reduced.

Figure 7E:
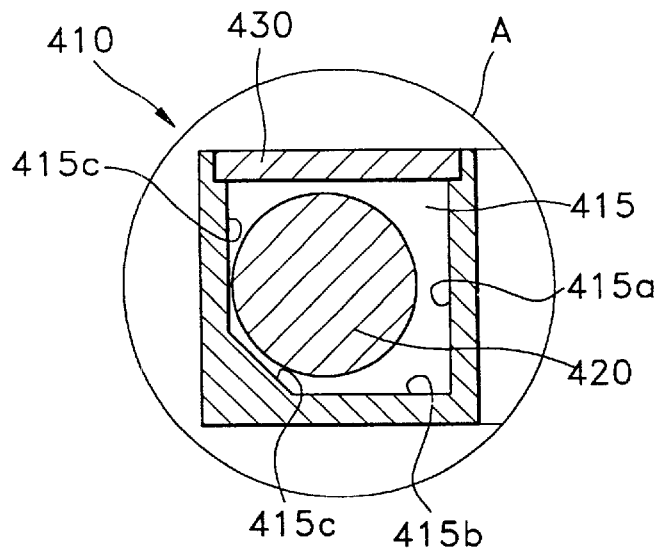

Referring to FIG. 7E, an angled surface 415d is formed throughout the lower portion of the outer circumferential wall 415c and a part of the bottom surface 415b. When the main body 410 is rotated, the ball 420 being in contact with both the bottom surface 415b and the angled surface 415d contacts the outer circumferential wall 415c and the angled surface 415d. Thus, a sliding frictional force occurring between the ball 420 and the bottom surface 415b can be reduced. Preferably, the angle of the angled surface 415d with respect to the bottom surface 415b is between about 15° and 45°.

Figure 7F:
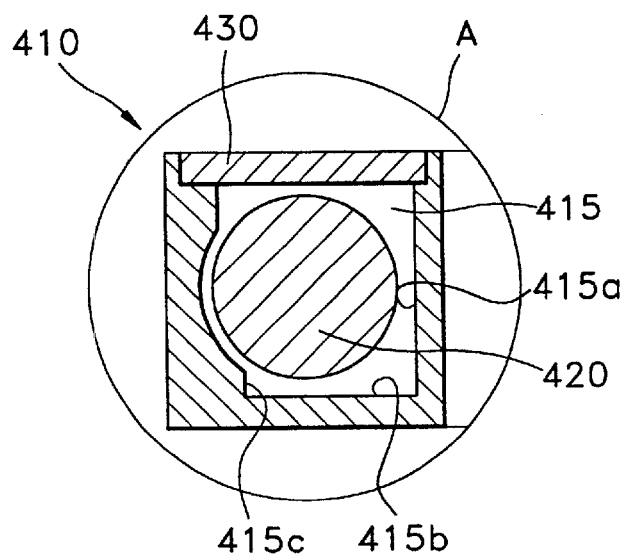

Referring to FIG. 7F, the outer circumferential wall 415c of the race 415 is rounded and is asymmetrical between upper and lower portions thereof. That is, the upper portion of the outer circumferential wall 415c is formed to be perpendicular to the bottom surface 415b while an inwardly rounded surface, that is, a surface concave with respect to the interior of the race, is formed throughout the middle and lower portions of the outer circumferential wall 415c. Thus, fine processing of the bottom surface 415b is not needed and a frictional force between the ball 420 and the race 415 can be reduced.

Figure 7G:
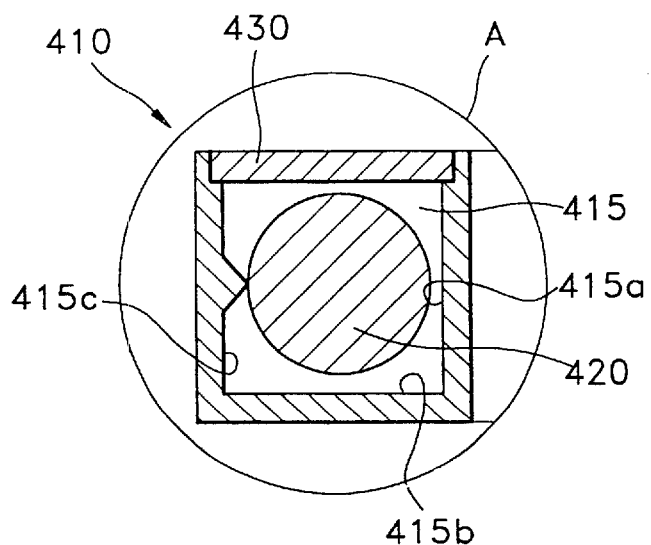

Referring to FIG. 7G, a protrusion of a wedge shape protruding toward the inner circumferential wall 415a is formed at the middle portion of the outer circumferential wall 415c. Here, upper and lower portions of the outer circumferential wall 415c each are perpendicular to the bottom surface 415b.

Figure 7H:
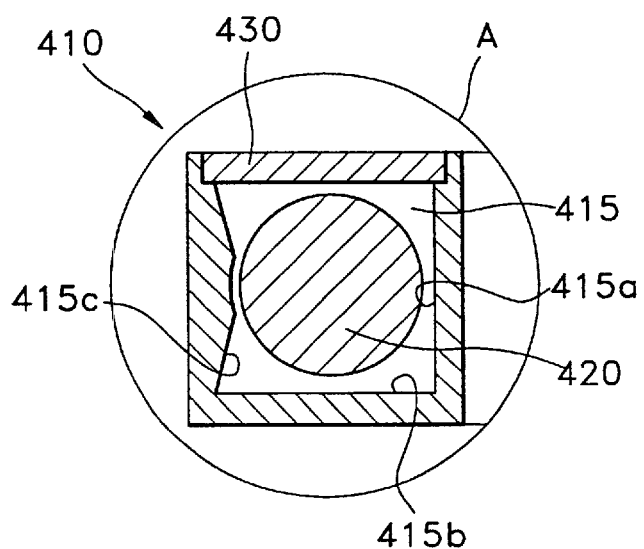

Referring to FIG. 7H, the entire surface of the outer circumferential wall 415c is formed to be a protrusion of a wedge shape protruding toward the inner circumferential wall 415a. Here, the tip of the protrusion which contacts the ball 420 is formed to be an inwardly rounded, that is, concave with respect to the interior of the race.

Figure 7I:
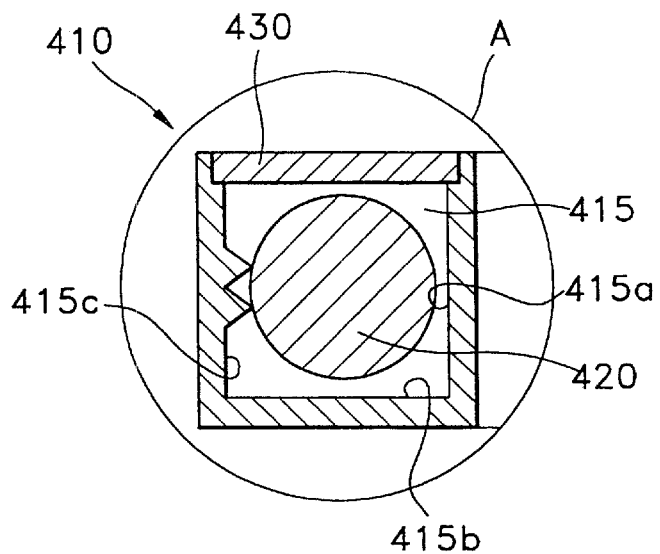

Referring to FIG. 7I, two wedge-shape protrusions protruding toward the inner circumferential wall 415a are formed at the middle portion of the outer circumferential wall 415c. Thus, fine processing of the bottom surface 415b is not needed and a frictional force between the ball 420 and the race 415 can be reduced.

Figure 7J:
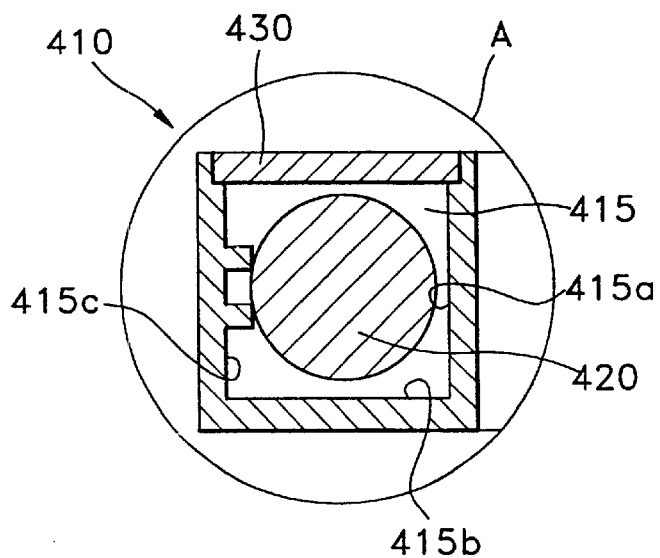

Referring to FIG. 7J, a pair of rectangular protrusions spaced apart a predetermined distance are formed at the middle portion of the outer circumferential wall 415c. The edge of the protrusions contact the ball 420 and guide the movement thereof. Thus, fine processing of the bottom surface 415b is not needed and a frictional force between the ball 420 and the race 415 can be reduced.

Figure 7K:
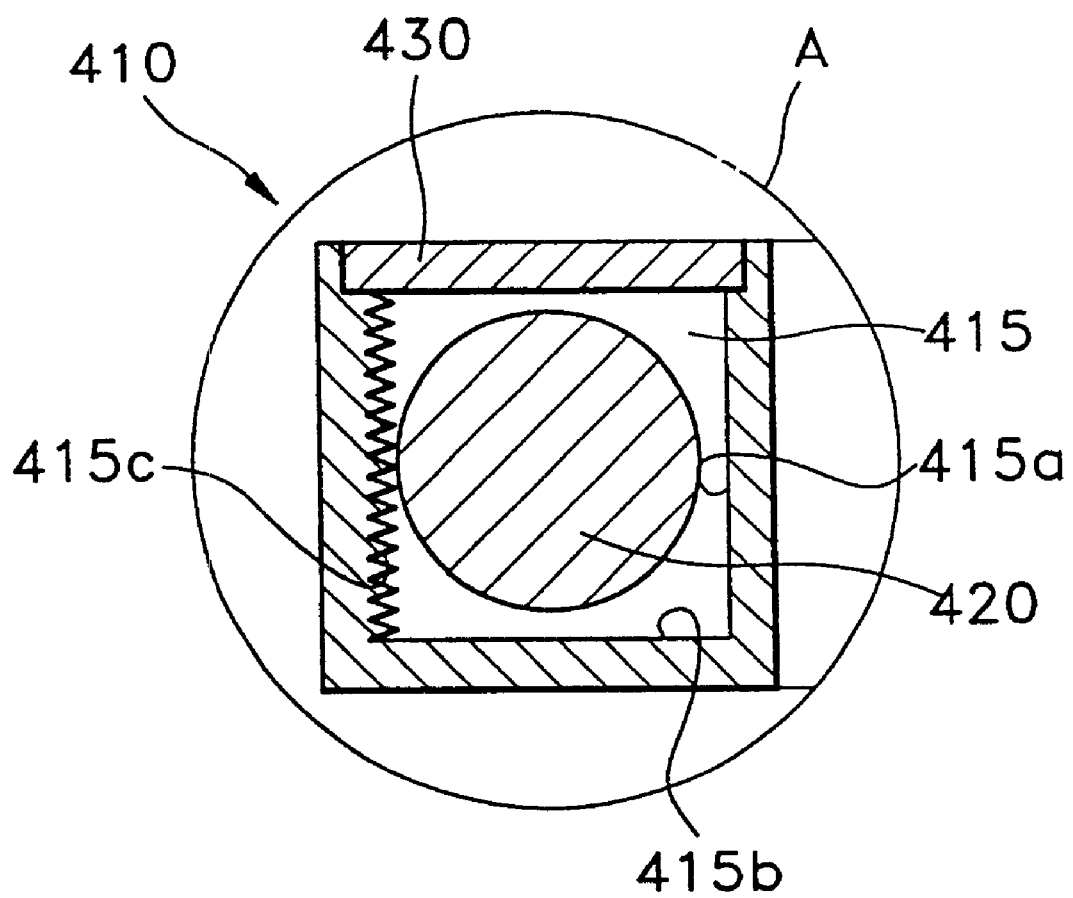

Referring to FIG. 7K, the entire surface of the outer circumferential wall 415c of the race 415 is saw-toothed.

As shown in FIGS. 7A through 7K, due to the above modifications of the surface of the race 415, a sliding frictional force becomes less than the race having a flat surface suggested by the present applicant so that there is less abrasion of the race 415 and the rolling friction is reduced.

As shown in FIG. 7A, an oil-based fluid 425 exhibiting low viscosity is preferably injected into the inside the race 415 in a small quantity. Here, just enough fluid 425 to coat the surfaces of the balls 420 to a thickness of several micrometers is sufficient. For example, when the diameter of the ball adopted is less than or equal to 5 mm, it is preferable to use a fluid exhibiting a viscosity index in the range of between approximately 0.6 cs and 60 cs.

As described above, according to the self-compensating dynamic ball balancer according to the present invention, the shape of the outer circumferential wall of the race is modified so that the sliding friction occurring between the ball and the bottom surface of the race can be considerably reduced. Also, by allowing the balls to rollingly contact the race, the balls can quickly move to the positions to restrict internal vibrations due to unbalanced mass so that capability of the balancer is remarkably improved. Further, since a small amount of fluid is injected into the race to coat the surfaces of the balls, the balls are dampened around the compensated positions and abrasion of the balls themselves can be prevented.

What is claimed is:

1. A dynamic balancer for a disk player, comprising:
   a main body having a circular shape, installed in a rotating body of the disk player;
   a circular race in said main body, defined by:
      an inner circumferential wall;
      a bottom surface extending outward from the bottom of said inner circumferential wall; and
      an outer circumferential wall contacting said bottom surface, said outer circumferential wall being asymmetric to said inner circumferential wall in a cross-section of the race taken perpendicular to the direction of rotation of the main body;
   a cover coupled to said main body for covering said circular race; and
   a plurality of balls disposed in said circular race for distributing mass as the main body rotates, said plurality of balls being free to rotate in said circular race and contacting only said outer circumferential wall due to centrifugal force during rotation of said main body, said balls remaining free to contact said bottom surface when said main body is not rotating.

2. The dynamic balancer of claim 1, said rotating body of the disk player being a rotor of a spindle motor of the disk player, a rotation shaft of the spindle motor of the disk player, a turntable of the disk player, or a clamper for holding the disk of the disk player.

3. The dynamic balancer of claim 1, said race being partially open for insertion of the balls.

4. The dynamic balancer of claim 1, further comprising an oil-based fluid within the race in quantity sufficient to coat the balls to a thickness of approximately several micrometers.

5. The dynamic balancer of claim 4, said oil-based fluid having a viscosity in the range of between approximately 0.6 to 60 cs.

6. The dynamic balancer of claim 1, further comprising:

said outer circumferential wall being arc-shaped concave relative to the inner circumferential wall, in said cross-section.

7. The dynamic balancer of claim 6, further comprising:

the radius of curvature of said arc-shape in said cross-section being greater than the radius of the balls.

8. The dynamic balancer of claim 1, further comprising:

said outer circumferential wall being perpendicular to the bottom surface at the upper and lower portions of the outer circumferential wall, and having an arc-shape, in said cross-section, concave relative to the inner circumferential wall, in a middle portion of the outer circumferential wall.

9. The dynamic balancer of claim 8, further comprising:

the radius of curvature of said arc-shape in said cross-section being approximately equal to the radius of the balls.

10. The dynamic balancer of claim 1, further comprising:

said outer circumferential wall being notch-shaped in said cross-section, pointing away from the inner circumferential wall.

11. The dynamic balancer of claim 1, further comprising:

the upper portion of said outer circumferential wall being perpendicular to said bottom surface, and the lower portion of said outer circumferential wall being shaped as an asymmetrical notch pointing away from the center of the main body, in said cross-section.

12. The dynamic balancer of claim 1, further comprising:

an angled surface formed in the lower portion of the outer circumferential wall and an outer portion of the bottom surface.

13. The dynamic balancer of claim 12, further comprising:

said angled surface being disposed at an angle in the range of approximately 15 to 45 degrees with respect to the bottom surface.

14. The dynamic balancer of claim 1, further comprising:

a lower portion of said outer circumferential wall perpendicular to said bottom surface;

an upper portion of said outer circumferential wall perpendicular to said bottom surface and disposed further from the center of the main body than said lower portion;

a middle portion of said outer circumferential wall having an arc-shape in said cross-section, concave relative to the inner circumferential wall.

15. The dynamic balancer of claim 1, further comprising:

a wedge shape formed in the middle portion of the outer circumferential wall protruding toward the inner circumferential wall, in said cross-section.

16. The dynamic balancer of claim 15, further comprising:

said outer circumferential wall being perpendicular to the bottom surface at the upper and lower portions of the outer circumferential wall.

17. The dynamic balancer of claim 1, further comprising:

said outer circumferential wall formed, in said cross-section, as a wedge protruding toward said inner circumferential wall, and having an arc shape, concave relative to the inner circumferential wall, formed at the tip of the wedge.

18. The dynamic balancer of claim 1, further comprising:

two protrusions, wedge-shaped in said cross-section, formed in the middle portion of the outer circumferential wall and protruding toward the inner circumferential wall.

19. The dynamic balancer of claim 1, further comprising:

two protrusions, rectangular in said cross-section, formed in the middle portion of the outer circumferential wall and protruding toward the inner circumferential wall.

20. The dynamic balancer of claim 1, further comprising:

the surface of said outer circumferential wall being sawtoothed in said cross-section.

* * * * *